(12) United States Patent
Zuckerberg et al.

(10) Patent No.: US 8,103,364 B2
(45) Date of Patent: Jan. 24, 2012

(54) WASTE DISPOSAL DURING PIT MINING

(75) Inventors: Mark Zuckerberg, East St. Kilda (AU);
Peter Mitchell Stone, Ripponlea (AU)

(73) Assignee: BHP Billiton Innovation Pty Ltd (AU)

( * ) Notice: Subject to any disclaimer, the term of this patent is extended or adjusted under 35 U.S.C. 154(b) by 124 days.

(21) Appl. No.: 12/164,638

(22) Filed: Jun. 30, 2008

(65) Prior Publication Data

US 2008/0290718 A1 Nov. 27, 2008

Related U.S. Application Data

(63) Continuation of application No. PCT/AU2006/001948, filed on Jul. 12, 2007.

(30) Foreign Application Priority Data

Dec. 30, 2005 (AU) ................................ 2005907342

(51) Int. Cl.
*E21C 41/26* (2006.01)
(52) U.S. Cl. ............... 700/28; 700/90; 700/213; 299/18
(58) Field of Classification Search ................ 299/11, 299/12, 18, 19; 700/28, 90, 213
See application file for complete search history.

(56) References Cited

U.S. PATENT DOCUMENTS

| | | | | |
|---|---|---|---|---|
| 4,466,669 A | * | 8/1984 | Sellers | 299/7 |
| 2007/0027612 A1 | * | 2/2007 | Barfoot et al. | 701/117 |

FOREIGN PATENT DOCUMENTS

| | | | | |
|---|---|---|---|---|
| CA | 1220232 A | * | 4/1987 | |
| RU | 2148713 C1 | | 5/2000 | |
| RU | 2204720 C2 | | 5/2003 | |
| SU | 1035217 A | | 8/1983 | |
| SU | 1218111 A | | 3/1986 | |
| WO | WO 2004033854 A1 | * | 4/2004 | |

OTHER PUBLICATIONS

International Search Report for corresponding PCT Patent Application Serial. No. PCT/AU2006/001948 dated Mar. 16, 2007.
Sevim, H., The Problem of Production Planning in Open Pit Mines, University of Toronto Press, Feb.-May 1998 (Provided by ProQuest Information and Learning Company), [Retrieved on Mar. 8, 2007] <URL:http://findarticles.com/p/articles/mi_qa3661/is_199802/ai_n8789654/print.

* cited by examiner

*Primary Examiner* — Sunil Singh
(74) *Attorney, Agent, or Firm* — Brinks Hofer Gilson & Lione; G. Peter Nichols

(57) ABSTRACT

A method, apparatus and computer program for pit mining with waste dumping is disclosed, in which material is extracted from an open pit and some of that material is sent to waste. The method optimises a joint extraction and waste refill schedule.

16 Claims, 8 Drawing Sheets

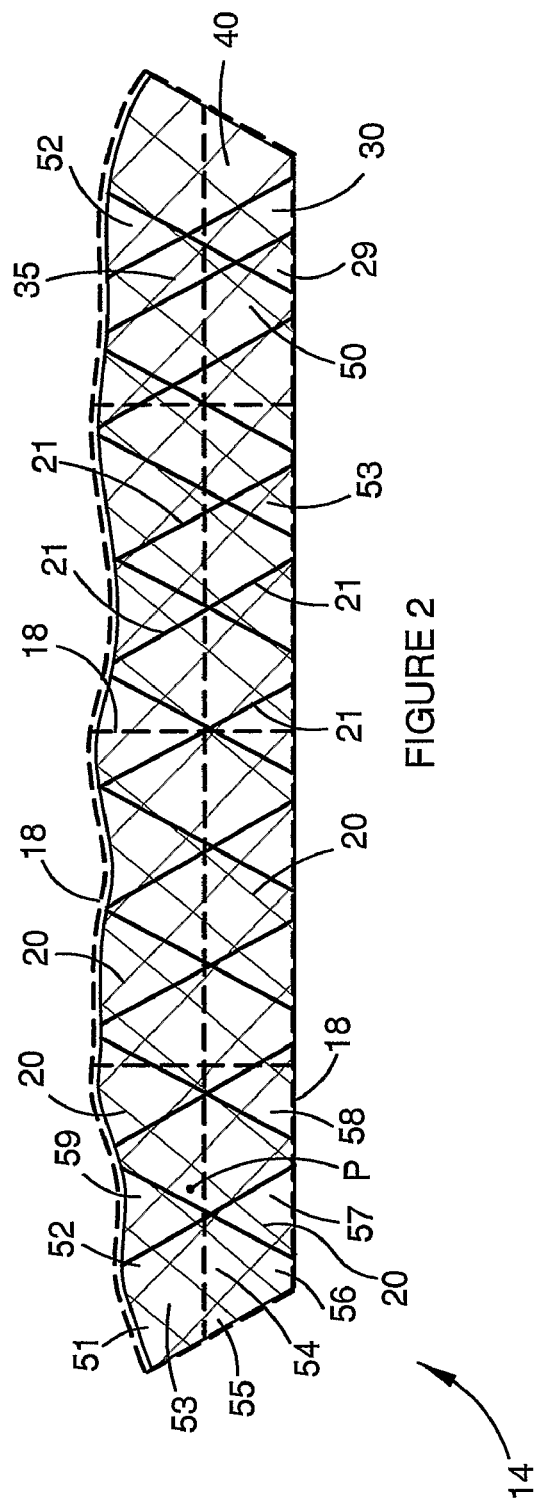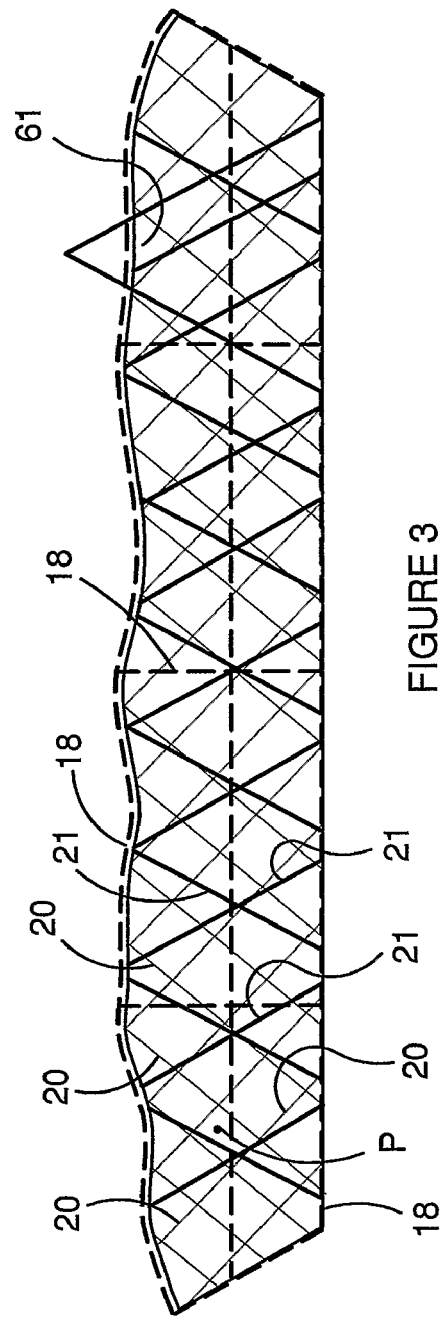

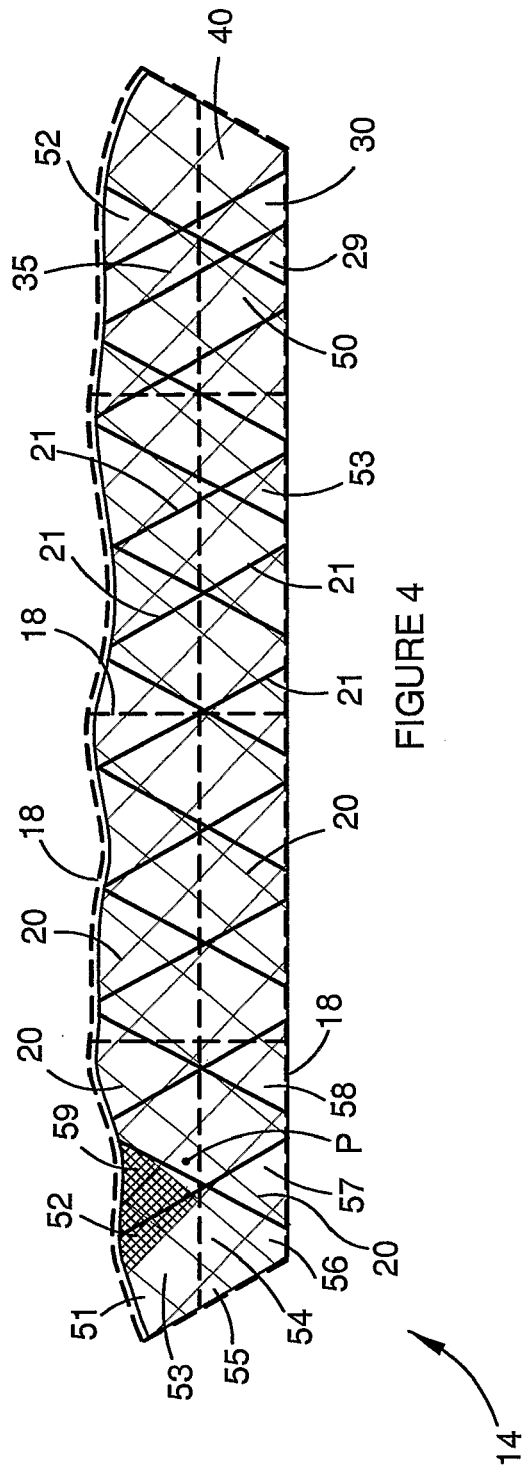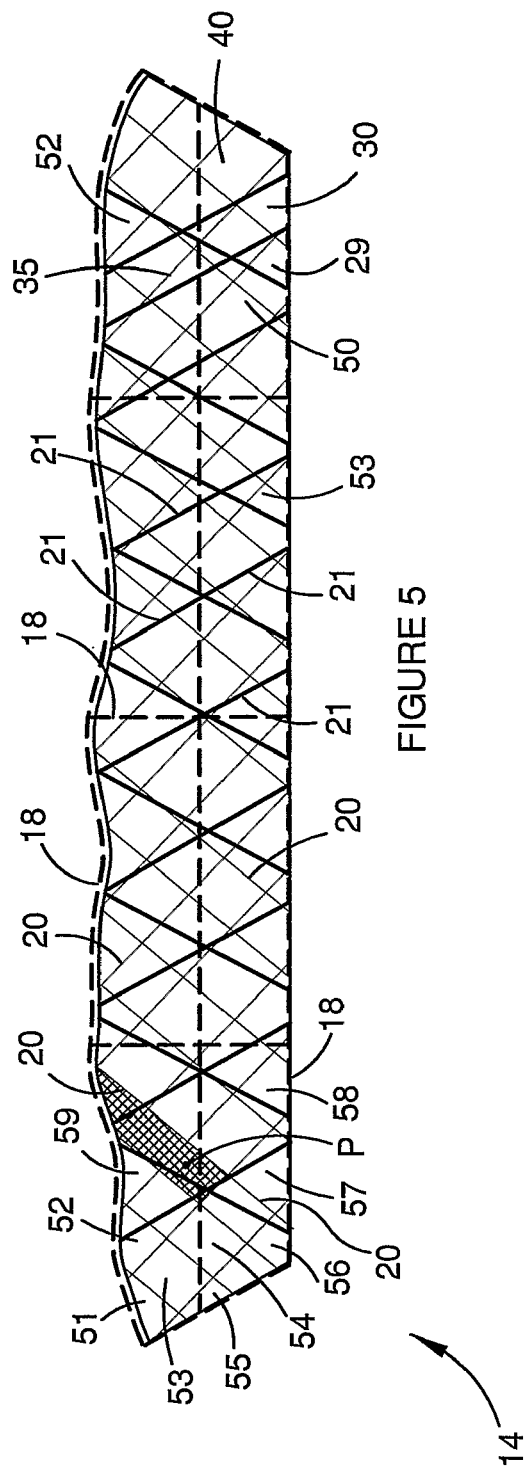

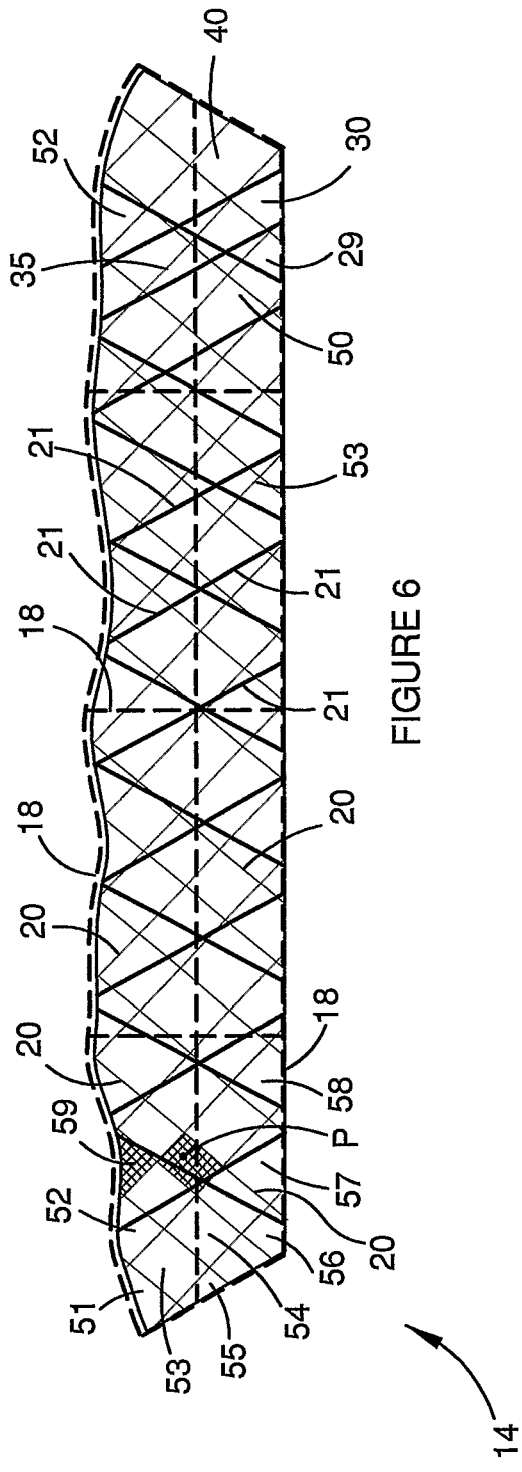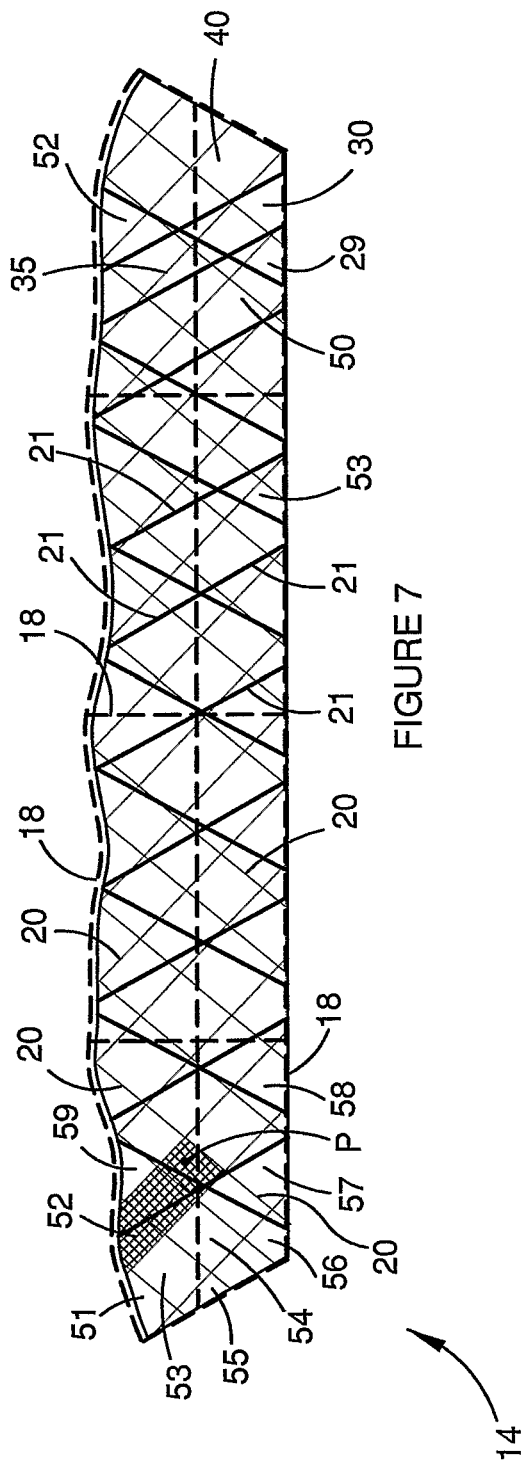

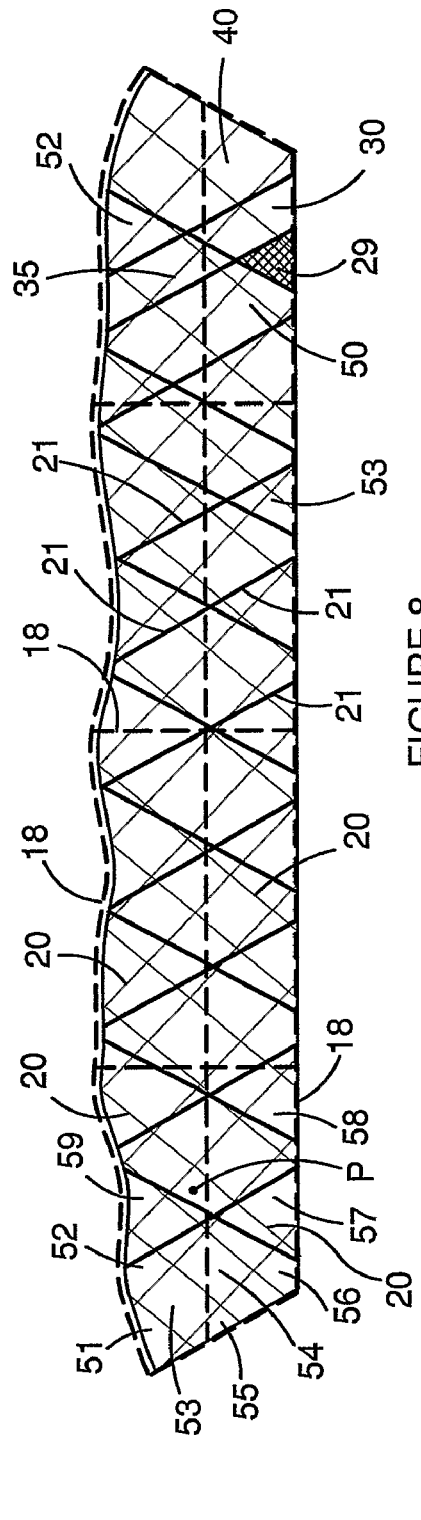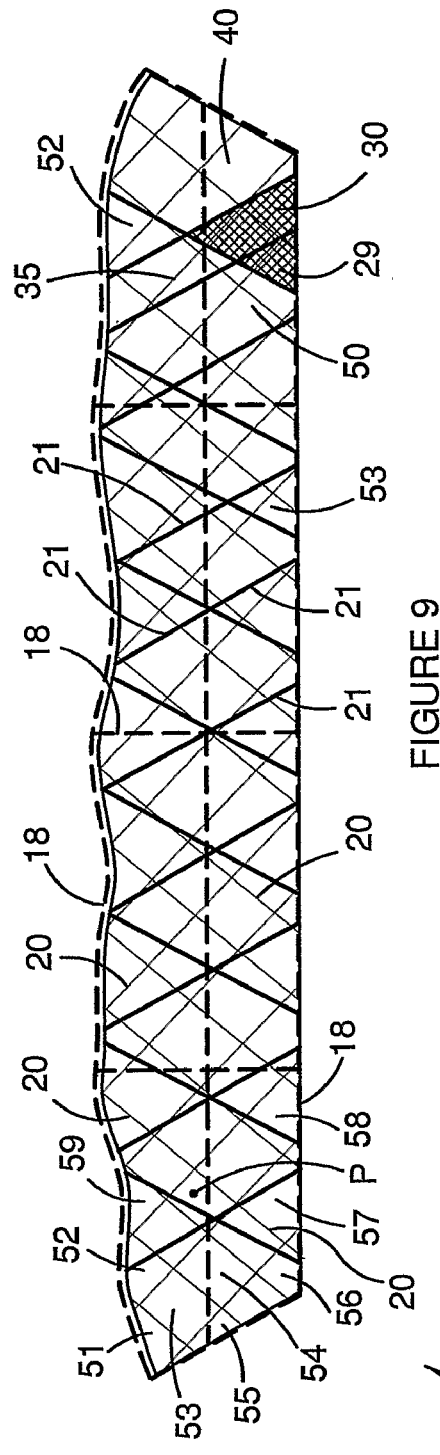

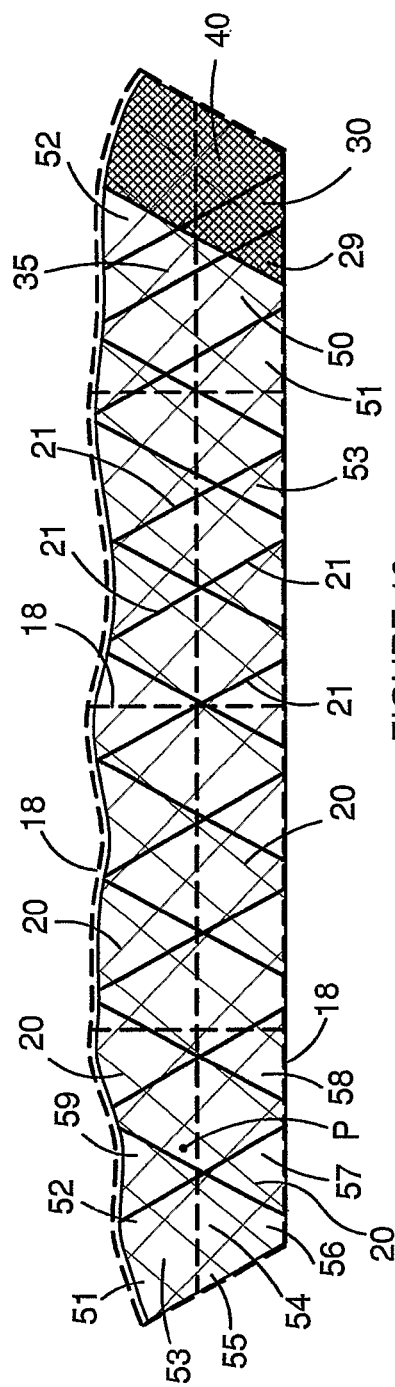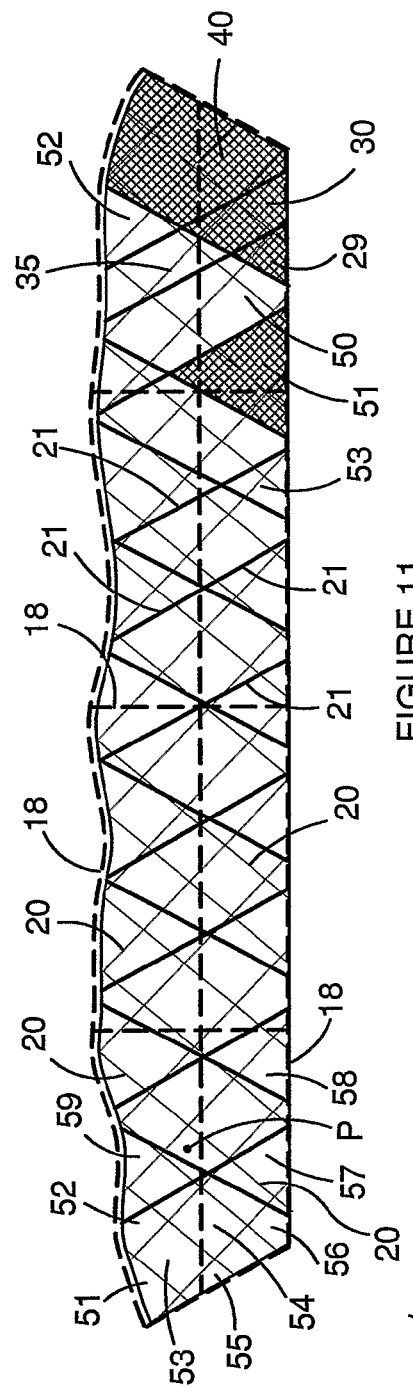

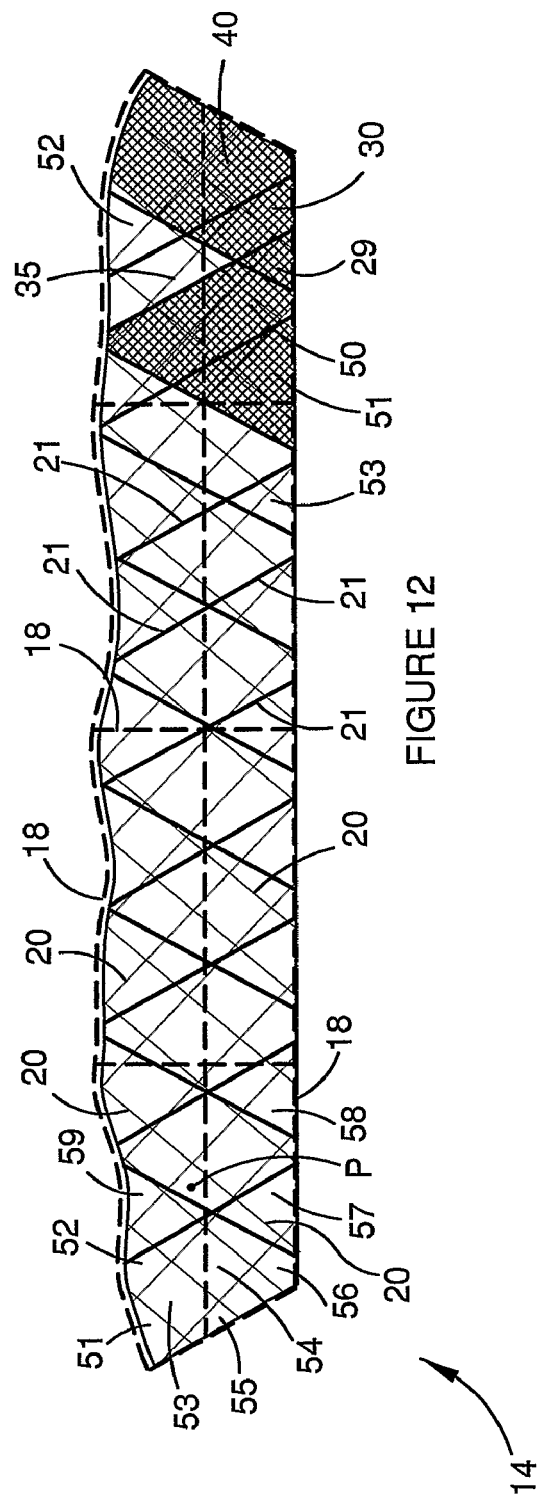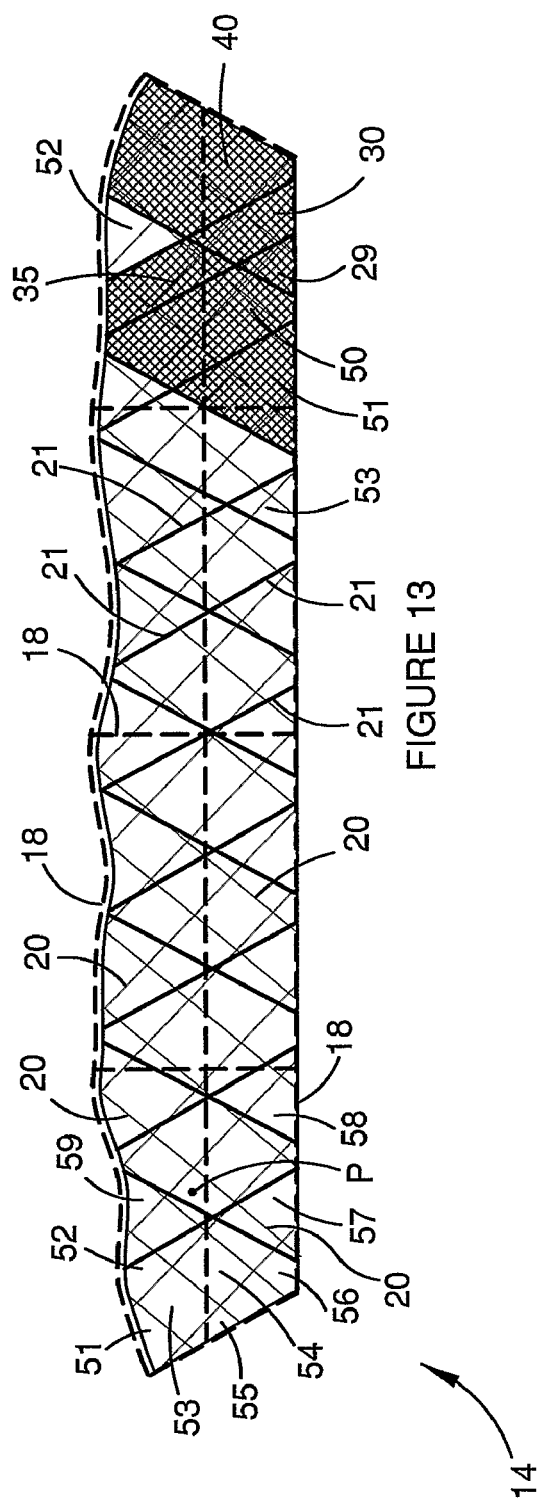

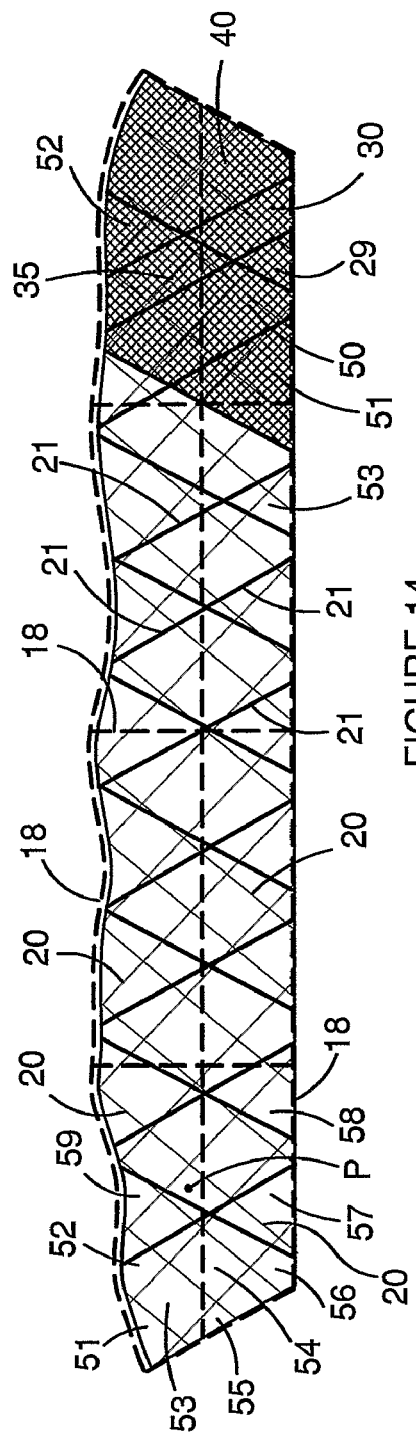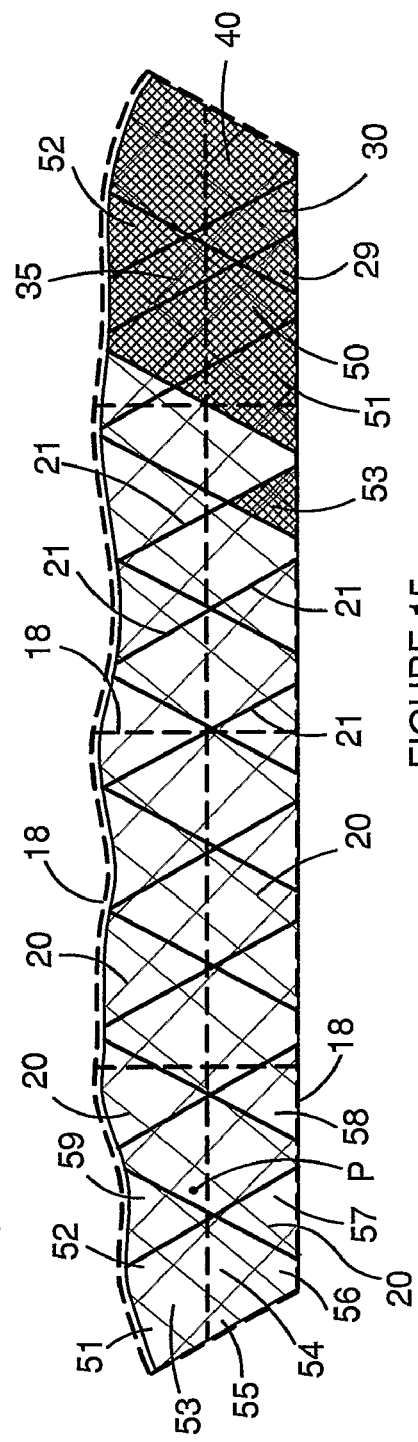

WASTE DISPOSAL DURING PIT MINING

This application is a continuation of and claims priority from PCT/AU2006/001948 published in English on Jul. 12, 2007 as WO 2007/076571 and from AU 2005907342 filed Dec. 30, 2005, the entire contents of each are incorporated herein by reference.

This invention relates to a method and apparatus for in-pit waste dumping.

Many mathematical models exist for open pit mining to schedule mining of material at particular parts of the pit whilst taking into account various constraints. These mathematical models enable extraction schedules to be developed which optimise the net present value of mine over the operating life of the mine.

Typically, a pit is divided into a number of "blocks" which are typically rectangular prisms of material, or aggregates of blocks, and mining takes place according to a predetermined schedule to maximise the net present value of the mine. This involves removing material from the mine and sending material to waste, to stockpile or to processing.

Typically a number of pits may be mined in a particular region concurrently and waste is usually dumped at a convenient location. However, often there is limited space available for the dumping of waste and also the dumping of waste may be environmentally undesirable. Waste disposal therefore needs to be considered to optimise net present value.

SUMMARY

The object of the invention is to provide a method of open pit mining which optimises net present value by including waste dumping, as well as an apparatus and program for performing the method.

The invention may be said to reside in a method of open pit mining with waste dumping, comprising: extracting material from the open pit and determining whether the material is sent to any one or more of stockpiling, waste and processing; defining a road network interconnected a plurality of zones; determining waste movement along the network from its origin being the zone in which the waste was produced to a destination being the zone in which the waste is to be dumped, to provide a joint extraction and waste movement strategy which optimises the net value of a joint extraction and waste movement schedule; and each zone containing a plurality of blocks, material extracted from one of the blocks in a zone being sent to a predetermined entry point on the road network, moving the material across the network and depositing the waste material at least one external waste dump, and some of the waste material being moved on the road network to terminate at one of the zones within the pit, and allocating the material moved to one of the zones within the pit proportionally to an in pit waste dump defined by a refill aggregate that overlaps with that zone, the refill aggregate being a space formed after extraction of material from that aggregate and therefore cleared of original material and after any refill aggregate which sits below that aggregate has been completely refilled.

Thus, a concurrent material and waste dump schedule is developed which can take into account environmental constraints on where waste can be dumped and in view of those constraints, produce an extraction and waste dump schedule which optimises net present value of the mine.

Most preferably the zone in which the waste is dumped is an in-pit zone.

By moving the waste along the network to a zone within the pit, the waste can be moved from one available space to another available space within the pit based on mining considerations and, in particular, which parts of the pit are to be next mined.

The invention may also be said to reside in a method of open pit mining with waste dumping, comprising: extracting material from an open pit and determining some proportion of the extracted material to go to waste; defining a road network having a plurality of nodes, at least some of the nodes defining entry points to a plurality of waste dumps, and wherein the waste dumps are selected from the group of at least one in pit waste dump and at least one external waste dump; and moving the material to go to waste along the network of roadways from a location in the pit to an entry node relating to one of the waste dumps and depositing the material to go to waste at the waste dump, to provide a joint extraction and waste movement strategy which optimises the net value of a joint extraction and waste movement schedule.

Preferably the step of extracting material comprises extracting material based on a block model extraction scheduule, and wherein the waste dump comprises an in pit waste dump defined by a space in the pit which is determined from one or more blocks of the block model which have already been subject to extraction.

In one embodiment the space comprises a block aggregation determined by aggregating a plurality of blocks in the block model.

Preferably the shape of the spaces is chosen to ensure that the spaces may be independently scheduled for refilling with waste, subject to precedent rules, without violating maximum waste repose slope constraints.

Preferably the pit is divided into a plurality of zones, each zone containing a plurality of blocks and potential refill spaces which form in pit waste dumps.

In one embodiment the method comprises moving waste from a zone in the pit, along the road network, to an external waste dump, and eventually from that external waste dump to an in pit waste dump.

Preferably a cost of extraction of material and its movement to waste is determined from the zone from which the waste is removed in the pit, the path the waste is moved on the road network via the nodes and to the waste dump in which the waste is dumped.

Preferably the pit is divided into a plurality of zones, each zone containing a plurality of blocks, material extracted from one of the blocks in a zone being sent to a predetermined entry point on the road network, moving the material across the network and depositing the waste material at at least one external waste dump, and some of the waste material being moved on the road network to terminate at one of the zones within the pit, and allocating the material moved to one of the zones within the pit proportionally to an in pit waste dump defined by a refill aggregate that overlaps with that zone, the refill aggregate being a space formed after extraction of material from that aggregate and therefore cleared of original material and after any refill aggregate which sits below that aggregate has been completely refilled.

The invention may also be said to reside in an apparatus for scheduling open pit mining with waste dumping, wherein material is extracted from an open pit and a determination is made that some proportion of the extracted material is to go to waste, a road network is provided having a plurality of nodes, at least some of the nodes defining entry points to a plurality of waste dumps, and wherein the waste dumps are selected from the group of at least one in pit waste dump and at least one external waste dump, and material to go to waste is moved along the network of roadways from a location in the pit to an entry node relating to one of the waste dumps and depositing the material to go to waste at the waste dump, the apparatus comprising: a processor for dividing the pit into a plurality of zones, and for allocating the material to be moved to one of the zones within the pit proportionally to an in pit waste dump defined by a refill aggregate that overlaps with that zone, the refill aggregate being a space formed after extraction of material from that aggregate and therefore cleared of original material and after any refill aggregate which sits below that aggregate has been completely refilled, to thereby provide a joint extraction and waste movement strategy which optimises the net value of a joint extraction and waste movement schedule.

The invention may also be said to reside in a computer program for scheduling open pit mining with waste dumping, wherein material is extracted from an open pit and some proportion of the extracted material is to go to waste, comprising: code for defining a road network having a plurality of nodes, at least some of the nodes defining entry points to a plurality of waste dumps, and wherein the waste dumps are selected from the group of at least one in pit waste dump and at least one external waste dump, so material to go to waste is moved along the network of roadways from a location in the pit to an entry node relating to one of the waste dumps and depositing the material to go to waste at the waste dump; code for dividing the pit into a plurality of zones, each zone containing a plurality of blocks so material extracted from one of the blocks in a zone is sent to a predetermined entry point on the road network and moved across the network and deposited at at least one external waste dump, and some is sent on the road network to terminate at one of the zones within the pit; and code for allocating the material moved to one of the zones within the pit proportionally to an in pit waste dump defined by a refill aggregate that overlaps with that zone, the refill aggregate being a space formed after extraction of material from that aggregate and therefore cleared of original material and after any refill aggregate which sits below that aggregate has been completely refilled, to thereby provide a joint extraction and waste movement strategy which optimises the net value of a joint extraction and waste movement schedule.

Preferably the program further comprises code for scheduling extraction of material based on a block model extraction schedule, and code for determining an in pit waste dump defined by a space in the pit which is determined from one or more blocks of the block model which have already been subject to extraction.

Preferably the program further comprises code for determining a cost of extraction of material and its movement to waste, from the zone from which the waste is removed in the pit, the path the waste is moved on the road network via the nodes and to the waste dump in which the waste is dumped.

BRIEF DESCRIPTION OF THE DRAWINGS

Preferred embodiments of the invention will be described, by way of example, with reference to the accompanying drawings, in which:

FIG. 2 is a side elevation of one of the pits shown in FIG. 1;

FIG. 3 is a side elevation of the other of the pits shown in FIG. 1;

FIGS. 4, 5, 6 and 7 are the same as FIG. 2 but showing in detail the aggregates which are being extracted to mine material at point P in the mine; and FIGS. 8, 9, 10, 11, 12, 13, 14 and 15 are diagrams the same as FIG. 2 showing the refilling of aggregates to provide in-pit waste dumping.

DETAILED DESCRIPTION

Figure 1:
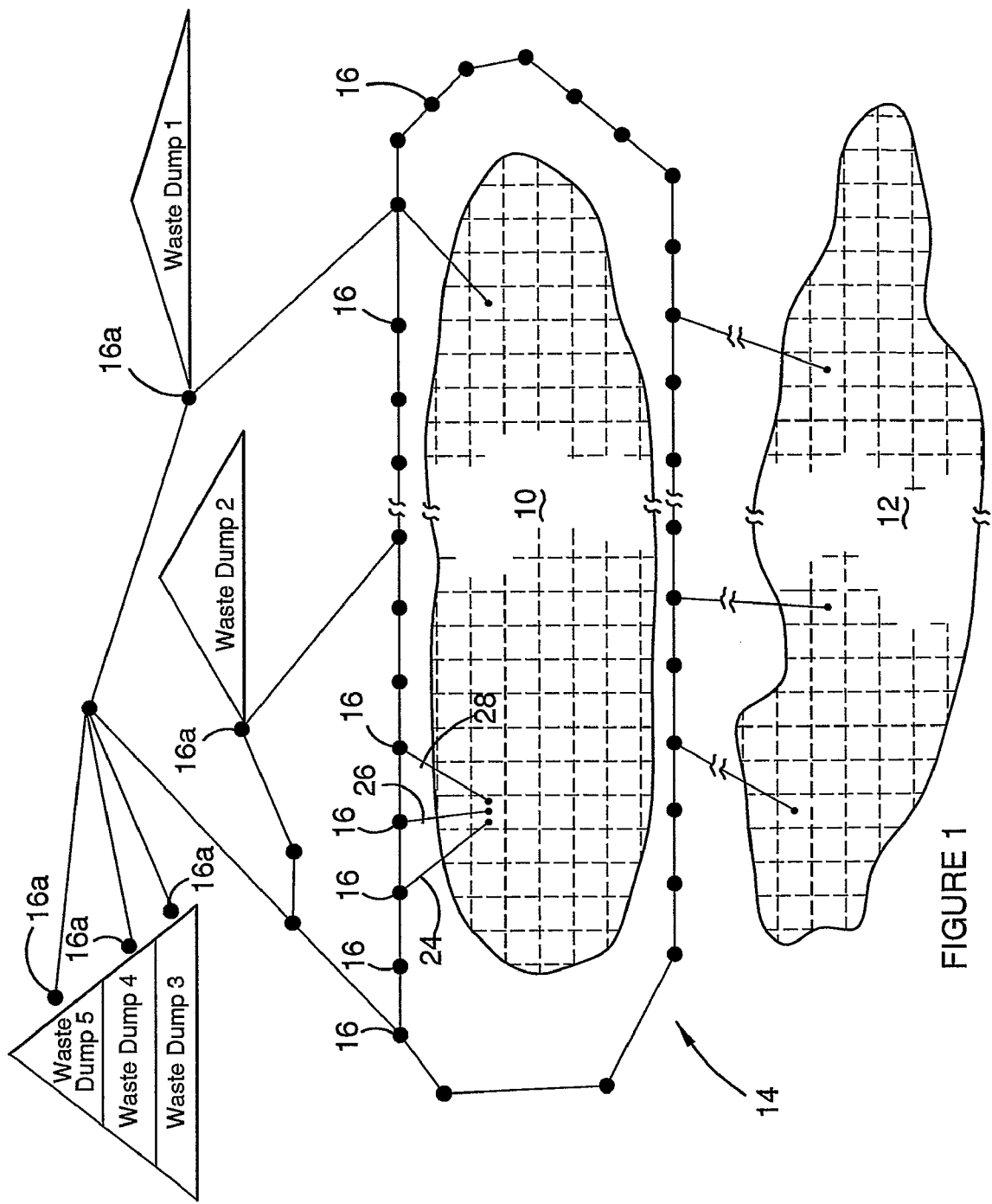
FIG. 1 is a plan view of an open pit and road network according to one embodiment of the invention.

Strategic mine planning optimisation is concerned with deciding when to schedule the extraction of blocks (or aggregate) of ore in an ore body over the life-of-operation whilst respecting all geotechnical slope restrictions and mining and processing capacity constraints. Typically an extraction schedule is determined which divides the pit of the mine (i.e. the region from which material is to be extracted) into a block model comprising typically between 10,000 and 20,000 blocks or aggregates. Typically a determination of the optimal ultimate pit limits for the blended ore operation taken over all block models that have been input by a user is determined. These limits are used to constrain the collection of blocks to be considered in constructing the detailed annual schedule for extraction of material. The various block models are partitioned into aggregates so that the user has a measure of control as to how many such aggregates there will be. Precedence structure among these aggregates is inherited from the precedence relationships that hold for their constituent blocks, and the resulting precedence rules are imposed upon the aggregates.

These aggregates can be sub-partitioned into smaller aggregates generally referred to as bins. A decision to extract an aggregate forces the extraction of every bin within the aggregate, but the processor is still free to make separate processing decisions for each of the constituent bins. The user defines the bins in such a way as to maximise the flexibility in processing material within the aggregates.

Taking an example from an iron ore operation, a typical bin would be the collection of hard cap material in an aggregate that has iron grade between 57% and 60% and silica grade less than 1.5%. There will typically be between 10 and 20 bins in each aggregate.

These aggregates and bins are scheduled over the life of mine in such a way as to maximise net present value whilst obeying mining capacity, processing capacity, market capacity and slope constraints.

The principle of the preferred embodiment of the invention for open pit mining with in-pit waste dumping is that the same way that rock is tracked as it is removed from the ground, we can also track the rock that is replaced in the ground. In particular, every block in a block model occupies a position in space, so in the same manner as there are 0,1 variables of the form $y(j,t)=1$ if and only if block j has been mined at or before period t, there are 0,1 variables $w(j,t)$ with $w(j,t)=1$ if and only if the location occupied by block j has been refilled with waste at or before period t. Precedence constraints are provided among the $w(j,t)$ to encode the slope constraints for the dumped waste, i.e. that the location of block j cannot be refilled in period t unless various other locations are also full at period t (either because they have been refilled themselves with waste at or before period t, or because they have never been extracted in the first instance).

Preferably the location at which waste is generated is tracked from each location j with variables of the form $u(j,k,t)$ denoting the tonnes of waste from location j that are dumped into location k during period t. The origin of the waste to be dumped in k is relevant as it determines the transportation cost. By dividing each pit into a network of interconnected zones, the number of variables is reduced, thereby making the problem of tracking waste manageable.

Thus, it is only necessary to introduce variables u(p,q,t) for zones p and q that are adjacent to one another, as well as costs associated with the movement of material between them, and a processor will then determine the best route from origin to destination via these elementary moves from zone to adjacent zone.

Preferably each pit zone will satisfy mass-balance constraints that ensure that the amount of waste produced in the extraction clumps that intersect the zone, plus the amount of waste transported into the zone from outside is equal to the amount of waste dumped in the zone plus the amount of waste transported out of the zone. A processor will decide how to allocate the volume of waste assigned to be dumped in the zone to the various refill clumps that intersect the zone. So long as one ensures that there are no non-positive cost cycles in the network, every optimal solution to this network flow sub-problem will be decomposable into path flows from locations in which waste is produced to locations in which waste is dumped.

Zones need not necessarily be subsets of pits. A zone can be a location along a road (in which case no waste is produced or dumped there), or an external waste dump. In this way the processor can properly cost movements along the mine's road network and to and from the external waste dumps as well.

One of the principal difficulties with the above approach is that enforcing precedence constraints on the refill spaces requires a binary variable for each "refill clump" and each period. This essentially doubles the number of integer variables with which the optimizer needs to concern itself.

To reduce the number of integer variables, it is preferred that the problem be solved in the following two phases.

In the first phase, precedences among the refill clumps will only be modelled approximately via continuous variables. The constraint will state that no refill clump can be more full than are its predecessors. The important observation is that while these "precedence constraints" do not fully capture the reality of the precedence relationship within the model (as a refill clump cannot start at all until its predecessors have been completely filled), they do in fact guarantee that a valid precedence relationship exists. That is, although the variables that represent the proportion of a refill clump filled at a particular time t may not describe any feasible reality, nevertheless a "feasible" solution to this relaxed model implies that there exists some genuinely feasible dumping schedule (for the unrelaxed model) that is compatible with the extraction schedule returned by the solution to the relaxed model. The reason for this, in broad terms, is that while it may not be possible to half fill a space that sits above a space that is only half full, we could nevertheless imagine that the material dumped into the air in this higher space simply falls into the lower space.

Given a solution to the "phase 1" problem, a "phase 2" problem can be solved in which extraction is forced to follow (or follow approximately) the schedule determined in phase 1 (thereby simplifying the problem and allowing us to implement the unrelaxed version of the precedence constraints) and the processor finds the best genuinely feasible solution to the waste dumping scheduling problem that is consistent with the extraction schedule.

With reference to FIG. 1 which shows a plan view of two pits 10 and 12 interconnected by a road network 14 with a plurality of nodes 16 defined along the road network 14. It should be understood that the pits 10 and 12 may be a large distance apart and the network 14 extremely long. The road network 14 has a plurality of waste dumps labelled waste dump 1 to waste dump 5, with each waste dump having an entrance node 16a associated with it.

FIGS. 2 and 3 show elevation views of the pits 10 and 12 respectively.

Each pit 10 and 12, as is shown in FIGS. 2 and 3, is divided into waste zone boundaries shown by the dashed lines 18 (only some labelled with the reference numeral 18) in FIGS. 2 and 3. The pit also has a plurality of raw material aggregate boundaries which define the blocks or aggregate of blocks, as represented by the fine black lines 20 (only some with the reference numeral 20) in FIGS. 2 and 3. The pit is also divided into a plurality of refill aggregate spaces which are defined by boundaries drawn in thick black lines 21 (only some labelled) in FIGS. 2 and 3. Material to be extracted from the pits is extracted in accordance with the block scheduling models previously described, and some of the material will go to processing, some to stockpiling for possible further processing and some will go to waste. In some operations, stockpiling may not be used and the material either goes to processing or to waste.

Initially, in the early years of the life of mine, the waste will go to the external waste dumps 1 to 5 because space has not been cleared in the pits 10 and 12 for in pit waste dumping. However, as more material is extracted from the mine, the refill boundaries 21 will define open spaces into which waste material can be dumped.

Typically the cost associated with moving waste material from its extraction point in the mine to one of the external waste dumps and then to an end pit waste dump, or directly to an end pit waste dump, is determined by the path the waste will follow in order to be moved from its place of extraction to the external waste dump or the in pit waste dump. This path is defined by the node 16 and therefore, by virtue of the number of nodes 16 which are crossed, a cost of waste movement can be determined. Each of the nodes 16 on the road network 14 are defined by a node number, a road number and a location number on that road. The same node number can be associated with multiple roads (this would indicate an intersection of two roads at that point). The locations along any one road are numbered consecutively from one. Costs per unit distance forward (i.e. to the next location number on the same road) and backwards are defined for each of the roads within the network, and the external waste dumps are each assigned a location on the network (as identified by the entry nodes 16a).

For each block in the block model, the user can assign up to three potential entry points 24, 26, 28 shown in FIG. 1 for waste produced in that block to enter the road network 14, along with the associated cost per cubic metre of waste to gain access to the road network 14. The entries from the pits 10 and 12 on to network 14 are shown as a single line for ease of illustration. It can be assumed conversely that these entry points also serve as departure points from which waste material on the road network may be dumped back into the space occupied by that block, and associated costs in dollars per cubic metre are also assigned.

However, to facilitate tractability, the movement of waste is not tracked at a block level. Instead, to facilitate tractability, the movement of waste is tracked at a zone level as defined by the zone boundaries 18 shown in FIGS. 1 to 3. The zones defined by the boundaries 18 are chosen so that two blocks can only belong to a single zone if they both link to the same road or roads on the network 14. For each road to which the block in a zone link, all blocks within the zone are considered to link to the average of the road locations of the constituent blocks, and at the average of the associated costs. In other words, for each block in a single zone, the same cost is associated with movement of waste onto the road network 14.

Therefore, the preferred embodiment of the present invention provides three distinct types of aggregation, namely: aggregation of blocks into extraction aggregations and bins; aggregation of the space occupied by blocks into refill aggregation spaces; and aggregation of the space occupied by blocks into waste zones.

These aggregations can be defined independently and thus, a zone may overlap several extraction aggregations, as well as several refill aggregations.

The optimised extraction and waste dumping schedule may seek to extract material identified at point P in FIG. 2. To do this, aggregates are initially extracted, as shown in FIG. 4 and cross-hatched. Additional aggregates shown in FIG. 5 and cross-hatched are then extracted to extract the material at point P. Alternatively, the schedule may merely specify that the sum of the two sets of aggregates shown in FIG. 4 and FIG. 5 are extracted in one operation rather than in two operations mentioned above.

Slope constraints would prevent extracting the aggregates shown in FIGS. 6 and 7 as an initial step because they would result in slopes which are likely to cause a landslide or cave-in.

As is best shown in FIGS. 2 and 3, refill aggregates 30, 35, 40 and 50 are spaces that may potentially be filled with waste material. The refill aggregates 30, 35, 40 and 50 are constructed from the input block models by aggregating the space occupied by blocks in the block model (possibly including air blocks) into disjoint spaces. The specific shape of these refill aggregates 30, 35, 40 and 50 is chosen in such a way as to ensure that the refill aggregates may be independently scheduled for refilling, subject to precedence rules, without violating maximum waste repose slope constraints. These constraints can be set by the user and merely comprise maximum slope angles for the waste when dumped into the spaces.

For example, if the space occupied by some constituent block in refill aggregate 30 must be refilled before the space occupied by some constituent block in refill aggregate 40, then according to the preferred embodiment of the invention, it will always be the case that there is no constituent block in refill aggregate 40 that must be refilled before the space occupied by any constituent block in refill aggregate 30. It is therefore sufficient to enforce a precedence rule that refill aggregate 30 must be completely filled before any dumping may take place into refill aggregate 40, as the shape of aggregate 30 is such that aggregate 30 can indeed be filled before any dumping is initiated into aggregate 40. The refill aggregate 35 is not considered available for dumping until all extraction aggregates that overlap the aggregate 35 by a predetermined radius have been cleared of their original material, and until all of its precedent refill aggregates (such as the aggregates 30, 40 and 50) have been completely refilled.

FIGS. 8 to 15 show the refill spaces being refilled in sequence with the space 29 being refilled first (FIG. 8), then the space 30 being refilled (FIG. 9), then the space 40 being refilled (FIG. 10), followed by the space 51 being refilled (FIG. 11), then the space 50 (FIG. 12), followed by the space 35 (FIG. 13), and then the space 52 (FIG. 14), and then the space 53 (FIG. 15). It should be emphasised that this is merely exemplary and the dumping of waste in the refill aggregates could follow a different schedule, depending on the available spaces whilst maintaining the slope constraints in order to provide optimum net present value of the mine in terms of both the extraction of material from the mine and the dumping of waste.

A refill aggregate 61 may extend above original ground level of the pit as shown in FIG. 3.

In another embodiment of the invention, an additional constraint relates to the filling of blocks which are located below the water table of the pit. In this embodiment, the entire refill aggregate containing a block that sits under the water table needs to be refilled and, to do this, those refill aggregates are split at the water table so that no extra refilling will be required to take place. To satisfy this constraint, material can be reclaimed from an external waste dump in the final year of the mine life and moved through the road network 14 back into the pits.

Since modifications within the spirit and scope of the invention may readily be effected by persons skilled within the art, it is to be understood that this invention is not limited to the particular embodiment described by way of example hereinabove.

In the claims which follow and in the preceding description of the invention, except where the context requires otherwise due to express language or necessary implication, the word "comprise", or variations such as "comprises" or "comprising", is used in an inclusive sense, i.e. to specify the presence of the stated features but not to preclude the presence or addition of further features in various embodiments of the invention.

The invention claimed is:

1. A method of open pit mining with waste dumping, comprising:
   extracting material from the open pit and determining whether the material is sent to any one or more of stockpiling, waste and processing;
   defining a road network interconnecting a plurality of zones;
   determining with a processor waste movement along the network from its origin being the zone in which the waste was produced to a destination being the zone in which the waste is to be dumped
   each zone containing a plurality of blocks, material extracted from one of the blocks in a zone being sent to a predetermined entry point on the road network, moving the material across the network and depositing the waste material in at least one external waste dump as determined by the processor, and some of the waste material being determined by the processor to be moved on the road network to terminate at one of the zones within the pit, and the processor allocating the material moved to one of the zones within the pit proportionally to an in pit waste dump defined by a refill aggregate that overlaps with that zone, the refill aggregate being a space formed after extraction of material from that aggregate and therefore cleared of original material and after any refill aggregate which sits below that aggregate has been completely refilled; and
   jointly optimizing the extraction of material and movement of waste with the processor to optimize the net value of a joint extraction and waste movement schedule.

2. The method of claim 1 wherein some of the waste determined by the processor is also dumped in an in-pit zone.

3. The method of claim 1, wherein jointly optimising the extraction of material and the scheduling of waste movement of extracted waste comprises obeying precedence constraints.

4. The method of claim 1, wherein jointly optimising the extraction of material and movement of waste comprises determining an order in which blocks of material are removed from the mine and an order in which space corresponding to previously extracted blocks is refilled.

5. A method of open pit mining with waste dumping, comprising:

extracting material from an open pit and determining some proportion of the extracted material to go to waste;

defining a road network having a plurality of nodes, at least some of the nodes defining entry points to a plurality of waste dumps, and wherein the waste dumps are selected from the group of at least one in pit waste dump and at least one external waste dump; and moving the material to go to waste along the network of roadways from a location in the pit to an entry node relating to one of the waste dumps as determined by a processor and depositing the material to go to waste at the waste dump as determined by the processor; and jointly optimizing the extraction of material and movement of waste with the processor to provide a joint extraction and waste movement strategy which optimises the net value of a joint extraction and waste movement schedule, wherein the step of extracting material comprises extracting material based on a block model extraction schedule, and wherein the waste dump comprises an in pit waste dump defined by a space in the pit which is determined by the processor from one or more blocks of the block model which have already been subject to extraction.

6. The method of claim 5 wherein the space comprises a block aggregation determined by the processor aggregating a plurality of blocks in the block model.

7. The method of claim 6 wherein the shape of the spaces is chosen by the processor to ensure that the spaces may be independently scheduled for refilling with waste, subject to precedence rules, without violating maximum waste repose slope constraints.

8. The method of claim 5 wherein the pit is divided by the processor into a plurality of zones, each zone containing a plurality of blocks and potential refill spaces which form in pit waste dumps.

9. The method of claim 8 further comprising moving waste as determined by the processor from a zone in the pit, along the road network, to an external waste dump, and eventually from that external waste dump to an in pit waste dump.

10. The method of claim 9 wherein a cost of extraction of material and its movement to waste is determined by the processor from the zone from which the waste is removed in the pit, the path the waste is moved on the road network via the nodes and to the waste dump in which the waste is dumped.

11. The method of claim 5 wherein the pit is divided by the processor into a plurality of zones, each zone containing a plurality of blocks, material extracted from one of the blocks in a zone being sent to a predetermined entry point on the road network, moving the material across the network as determined by the processor and depositing the waste material at least one external waste dump as determined by the processor, and some of the waste material being moved on the road network to terminate at one of the zones within the pit as determined by the processor, and the processor allocating the material moved to one of the zones within the pit proportionally to an in pit waste dump defined by a refill aggregate that overlaps with that zone, the refill aggregate being a space formed after extraction of material from that aggregate and therefore cleared of original material and after any refill aggregate which sits below that aggregate has been completely refilled.

12. The method of claim 5, wherein jointly optimising the extraction of material and the scheduling of waste movement of extracted waste comprises obeying precedence constraints.

13. An apparatus for scheduling open pit mining with waste dumping, wherein material is extracted from an open pit and a determination is made that some proportion of the extracted material is to go to waste, a road network is provided having a plurality of nodes, at least some of the nodes defining entry points to a plurality of waste dumps, and wherein the waste dumps are selected from the group of at least one in pit waste dump and at least one external waste dump, and material to go to waste is moved along the network of roadways from a location in the pit to an entry node relating to one of the waste dumps and depositing the material to go to waste at the waste dump, the apparatus comprising:

a processor for dividing the pit into a plurality of zones, for allocating the material to be moved to one of the zones within the pit proportionally to an in pit waste dump defined by a refill aggregate that overlaps with that zone, the refill aggregate being a space formed after extraction of material from that aggregate and therefore cleared of original material and after any refill aggregate which sits below that aggregate has been completely refilled, and for providing a joint extraction and waste movement strategy which optimises the net value of a joint extraction and waste movement schedule.

14. A method of generating a schedule of open pit mining with waste dumping, comprising:

defining a road network interconnecting a plurality of zones;

scheduling extraction of material from the open pit by determining with a processor whether the material is to be sent to any one or more of stockpiling, waste and processing;

scheduling waste movement by determining with a processor waste movements for material to be extracted as waste, such that extracted waste will be moved along the network from an origin zone in which the waste was produced to a destination zone in which the waste is to be dumped, some waste material extracted from a specific origin zone being sent to a predetermined entry point on the road network, moved across the network and deposited in at least one external waste dump, and other waste material from the specific origin zone being moved on the road network to terminate at a destination zone within the pit, whereafter the other material is allocated proportionally to an in pit waste dump defined by a refill aggregate that overlaps with that destination zone, the refill aggregate being a space formed after extraction of material from that aggregate and therefore cleared of original material and after any other refill aggregate which sits below that refill aggregate has been completely refilled; and jointly optimising with the processor the scheduling of extraction of material and the scheduling of waste movement of extracted waste.

15. The method of claim 14, wherein jointly optimising the scheduling of extraction of material and the scheduling of waste movement of extracted waste comprises obeying precedence constraints.

16. The method of claim 14, wherein jointly optimising the scheduling of extraction of material and movement of waste comprises processing at least one block model of the mine and determining an order in which blocks of material are removed from the mine and an order in which space corresponding to previously extracted blocks is refilled.

* * * * *